United States Patent [19]

England

[11] 4,024,625
[45] May 24, 1977

[54] WET PELLET ELECTROLYTIC CAPACITOR METHOD

[75] Inventor: Walter F. England, Williamstown, Mass.

[73] Assignee: Sprague Electric Company, North Adams, Mass.

[22] Filed: May 28, 1975

[21] Appl. No.: 581,511

[52] U.S. Cl. .................................. 29/570; 361/433
[51] Int. Cl.² ........................................ H01G 9/00
[58] Field of Search ..................... 29/570; 317/230

[56] References Cited

UNITED STATES PATENTS

| 2,743,400 | 4/1956 | Bujan | 317/230 |
| 3,293,507 | 12/1966 | Smith | 29/570 |
| 3,373,320 | 3/1968 | Krock | 29/570 |
| 3,624,458 | 11/1971 | Howell | 29/570 |

Primary Examiner—W. Tupman
Attorney, Agent, or Firm—Connolly and Hutz

[57] ABSTRACT

Reverse voltage capability and increased cathode capacitance are obtained in a polar wet pellet electrolytic capacitor by welding a presintered porous disk of valve-metal particles to the inside bottom of a can having a valve-metal inner surface.

5 Claims, 4 Drawing Figures

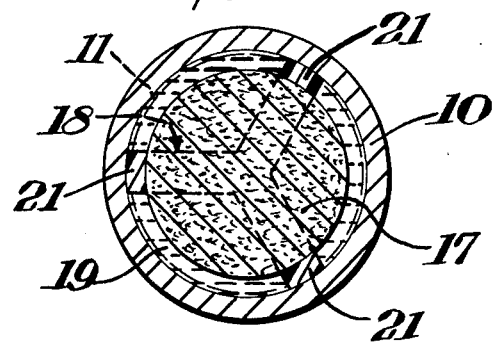
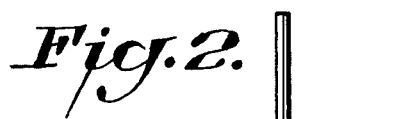
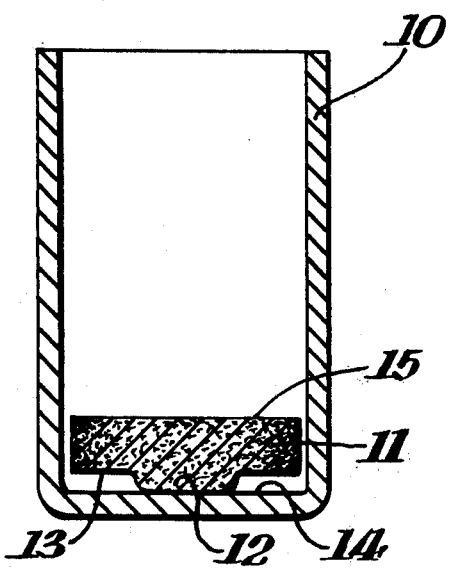
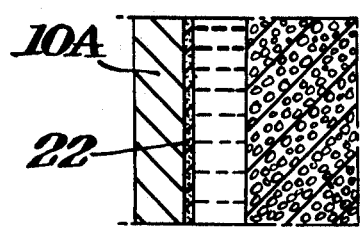

WET PELLET ELECTROLYTIC CAPACITOR METHOD

BACKGROUND OF THE INVENTION

This invention relates to a polar wet pellet electrolytic capacitor method, and more particularly to a method of assembling the cathode of a wet pellet-type polar electrolytic capacitor.

In polar electrolytic capacitors the voltage is typically applied to the film-formed anode so that this is customarily termed the forward voltage. It is desirable, however, to provide the polar electrolytic capacitor with an ability to withstand at least a low voltage applied to the cathode, which is termed a reverse voltage. In order to possess this reverse voltage capability the cathode element must also have on its surface a dielectric film, and accordingly consists of a valve-metal.

Further the prime purpose of a capacitor is to provide capacitance, which in turn is directly related to cathode surface area. Therefore it is important to obtain in a wet polar electrolytic capacitor both an ability to withstand a reverse voltage and also a capacitor surface area capable of providing adequate capacitance.

It has been proposed to provide in a capacitor such as described above, a porous cathode in the capacitor can in the closed end of the can by inserting tantalum particles into the can and, when thus positioned within the can, sintering the particles to each other and to the can. This technique, among other disadvantages, necessitates the heating of the can. This leads to such shortcomings as the possible embrittlement of the metal can and the costly consumption of space and energy in a vacuum sintering furnace.

It is an object of this invention to provide a method that overcomes these and other related disadvantages of the prior art.

It is another object of this invention to provide a method for producing a polar wet electrolytic capacitor having a reverse voltage capability and high capacitance.

Still another object of this invention is the production of an increased capacitor surface carrying a dielectric for a polar wet electrolytic capacitor without subjecting the capacitor can to deleterious heat.

SUMMARY OF THE INVENTION

A porous film-formed cathode body is composed of particles of a suitable valve metal which are shaped into a disk-like body and heated to a sintering temperature. After sintering at the appropriate time and temperature the shaped particles become a coherent porous body with the particles securely fused together but with interstices throughout.

A capacitor can having an open end and formed with a flat bottom receives the porous shaped sintered body. The sintered body is shaped with a bead or raised portion on one surface and this bead is positioned against the inner wall of the bottom of the can and holds the main part of the body spaced away from the can wall. A welding means is applied inside the can against the sintered body and another electrode is placed against the bottom of the outside of the can. Then the sintered body is welded to the inside of the metal can at the bead. The bead further serves to concentrate the heat of welding.

In a modification of the present invention a lead wire is welded to the outside of the can simultaneously with the welding of the sintered body to the inside of the container. The assembly of the electrolytic capacitor is then completed.

In another modification, the capacitor can is only lined in the interior with tantalum metal, the major portion consisting of some other suitable metal, such as nickel or stainless steel.

BRIEF DESCRIPTION OF THE DRAWINGS

FIG. 1 shows an axial sectional view of a cylindrical electrolytic capacitor can containing a presintered body positioned according to the method of this invention.

FIG. 2 shows an axial sectional view of an assembled wet electrolytic capacitor as prepared according to the method of this invention.

FIG. 3 shows a radial section of the electrolytic capacitor taken on line 3—3 in FIG. 2 in direction of the arrows.

FIG. 4 is a break-away axial section of the electrolytic capacitor can and anode showing a modification of the can wall.

PREFERRED EMBODIMENT OF THE INVENTION

A cylindrical can 10 of tantalum and having an open end is shown in FIG. 1. A porous sintered body 11 of finely divided particles is prepared by pressing and sintering tantalum particles. The particles are sintered by heating to form the porous body 11 which has myriad interstices, so that the body will readily receive impregnants. The porosity is in part determined by the size of the sintered particles so that the coarser the powder used the more porous is the resultant body 11. The body 11 has an integral raised center portion or bead 12 on one of its surfaces 13. Subsequent to sintering, the shaped sintered body 11 is positioned at the bottom of the can 10 on the inner surface 14 with the bead 12 seated against the surface 14. The bead 12 provides the dual function of a spacing member and of facilitating welding of the body to the can 10. The bead 12 may be welded to the inner surface 14 by applying a welding electrode to the upper surface 15 of the body 11 and applying an appropriate welding current.

After the body 11 has been welded in the can 10 a dielectric film is formed on the film-forming inner surfaces of the can 10 and the interstices of the body 11 by suitable formation procedures. Primarily it is desired to provide a small reverse voltage capability so that in practice the formation is at a voltage of approximately 7 volts to provide a reverse voltage capability of 2 to 3 volts.

FIG. 2 shows an assembled capacitor 10 having an external cathode lead 16 attached to the can 10. This lead 16 may be welded to the can 10 as part of the operation of welding the body 11 to the interior surface 14. A porous anode pellet 17 is positioned within the can 10 and seated in a spacer 18 which supports and centers the anode 17 in can 10. An electrolyte 19 is made up of a gelled sulfuric acid with colloidal silica and is filled into the can 10 and impregnated into the body 11 and the anode 17. A suitable closure 20 at the open end of the can 10 completes tbe assembly.

The spacer 18 rests on the upper surface 15 of the body 11 and provides spacing between the body 11 and the anode 17, and is shaped to permit easy access of the electrolyte 19 to the body 11.

The radial section of FIG. 3 shows the skeletal form of the spacer 18 which is 3-legged and each leg has an arm 21 projecting axially from the radial arm between the anode 17 and the can 10.

The modification illustrated in FIG. 4 shows a portion of the wall of a can 10A made up of stainless steel with a tantalum inner coating 22 clad to the inner surface. Inasmuch as the body 11 is presintered before being welded into the can; the can need not be of a material capable of withstanding the temperature of sintering. However, the inner surface of the can must still be of a valve metal so as to permit formation of a dielectric film.

Among other advantages, the present invention avoids heating the capacitor can to sintering temperatures. As pointed out above this eliminates the objectionable embrittlement of the cans. Further, the sintering operation of this invention by eliminating the can from the sintering step saves space in the vacuum chamber of a sintering furnace and provides a more efficient use of required energy.

The porous cathode body 11 is mounted in the can 10 spaced away from the can wall on all sides. Thus the thixotropic electrolyte 19 can flow to reach substantially all the body surfaces after it is fastened in the can. This is an important feature as in facilitating the penetration of the electrolyte throughout the assembly.

EXAMPLE

An electrolytic capacitor was assembled by preparing a body of sintered fine particles of tantalum powder 0.050 inch in height and 0.315 inch diameter, and the body in a tantalum capacitor can of about 0.335 inch diameter. The body was welded to the inside of the bottom of the can by conventional welding apparatus. The can was then filled with a formation electrolyte and the can and body formed to a capacitance of 496 $\mu$f at a voltage of around 7 volts to provide a voltage rating of at least 2 volts. An electrolyte of 40% sulfuric acid containing colloidal silica in a thixotropic mixture was placed in the can. An anode of 0.250 inch diameter and 0.268 inch length consisting of sintered tantalum particles and suitably formed to a capacitance of approximately 915 $\mu$f was prepared and inserted in the electrolyte in the can. A suitable end closure was applied to the open end of the can to provide a seal.

The assembled capacitor had a total capacitance of 322 $\mu$f and a reverse voltage rating of over 2 volts.

The tantalum particles making up the porous cathode body according to this invention may be coarse or fine. The coarse particles have an average particle diameter of from about 10 microns to 7 microns and a C × V/gm value of from 2000 to 3500. The fine particles on the other hand range below 7 microns and a C × V/gm of more than 3500, preferably from 5 microns to 4 microns and up to around a C × V/gm of 6000. The coarse particles provide a more porous body which for a given set of pressing and sintering conditions tends to give better conductivity in a capacitor. On the other hand, fine particle powders provide higher capacitance per unit volume for a given set of pressure and sintering conditions.

What is claimed is:

1. In the method of assembling a wet pellet-type polar electrolytic capacitor the steps of providing a porous body of sintered particles of a valve metal, inserting said body into a can having an inner surface of said valve metal and closed at one end, welding said body to the inside bottom of said can, forming a dielectric film of an oxide of said valve metal on said surface and the pores of said body.

2. The method of assembling a capacitor as claimed in claim 1 wherein the valve metal of the particles of the porous body is tantalum.

3. In the method of assembling a capacitor as claimed in claim 1, the step of impregnating the porous body with a capacitor electrolyte.

4. The method of assembling a wet pellet-type polar electrolytic capacitor comprising providing a porous body of sintered particles of a valve metal, inserting said body into a can having an inner surface of said valve metal and closed at one end, welding said body to the inside bottom of said can, forming a dielectric film of an oxide of said valve metal on said surface and the pores of said body, inserting into said can a sintered porous pellet of a valve metal having a dielectric thereon, inserting into said can an electrolyte compatible with the valve metal and capable of penetrating into the pores of said body and said pellet, and sealing the open end of said can.

5. The method as claimed in claim 4 wherein the formation voltage in the formation of the dielectric film on the anode is higher than the formation voltage in the formation of the cathode.

* * * * *

UNITED STATES PATENT OFFICE
CERTIFICATE OF CORRECTION

Patent No. 4,024,625   Dated May 24, 1977

Inventor(s) Walter F. England

It is certified that error appears in the above-identified patent and that said Letters Patent are hereby corrected as shown below:

Column 1, line 17, after "ment" insert -- of the capacitor --

Column 2, line 42, after "body" insert -- 11 --

Column 3, line 34, after "and" (second occurrence) insert
-- positioning --

Signed and Sealed this sixteenth Day of August 1977

[SEAL]

Attest:

RUTH C. MASON
Attesting Officer

C. MARSHALL DANN
Commissioner of Patents and Trademarks